United States Patent
Ho et al.

(10) Patent No.: US 10,067,483 B1
(45) Date of Patent: Sep. 4, 2018

(54) CONTROLLING ELECTRICAL DEVICE BASED ON TEMPERATURE AND VOLTAGE

(71) Applicant: Apple Inc., Cupertino, CA (US)

(72) Inventors: Ching E. Ho, Santa Clara, CA (US); Antonietta Oliva, San Jose, CA (US); James S. Ismail, San Jose, CA (US); John G. Dorsey, San Francisco, CA (US); Keith Cox, Sunnyvale, CA (US); Norman J. Rohrer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 14/471,164

(22) Filed: Aug. 28, 2014

(51) Int. Cl.
| | |
|---|---|
| *G06Q 10/06* | (2012.01) |
| *G06F 17/18* | (2006.01) |
| *G05B 19/4065* | (2006.01) |
| *G05B 13/02* | (2006.01) |
| *G05B 23/02* | (2006.01) |

(52) U.S. Cl.
CPC .......... *G05B 13/02* (2013.01); *G05B 19/4065* (2013.01); *G05B 23/0283* (2013.01); *G05B 2219/36291* (2013.01); *G05B 2219/36347* (2013.01); *G05B 2219/37252* (2013.01); *G05B 2219/50185* (2013.01)

(58) Field of Classification Search
CPC ............ G05B 19/4065; G05B 23/0283; G05B 2219/36291; G05B 2219/36347; G05B 2219/37252; G05B 2219/50185
See application file for complete search history.

(56) References Cited

U.S. PATENT DOCUMENTS

| | | | |
|---|---|---|---|
| 5,867,809 A | 2/1999 | Soga et al. | |
| 5,877,419 A | 3/1999 | Farokhzad | |
| 6,208,256 B1* | 3/2001 | Fleming | B60K 28/066 340/632 |
| 6,433,696 B1* | 8/2002 | Deiterman | G01N 33/004 340/632 |
| 6,436,712 B1* | 8/2002 | Yurgil | G01N 33/004 436/55 |
| 7,127,373 B2* | 10/2006 | House | G05B 23/0283 702/182 |
| 7,243,042 B2* | 7/2007 | Plotts | G01K 3/04 374/E3.004 |

(Continued)

FOREIGN PATENT DOCUMENTS

| | | | | |
|---|---|---|---|---|
| WO | WO-0133213 A2 * | 5/2001 | ........... | G01N 33/004 |
| WO | WO-03002204 A3 * | 4/2003 | ............. | A62B 9/006 |

*Primary Examiner* — Ronald D Hartman, Jr.
(74) *Attorney, Agent, or Firm* — Meyertons, Hood, Kivlin, Kowert & Goetzel, P.C.; Lawrence J. Merkel (57) ABSTRACT

In an embodiment, a lifetime controller is configured to monitor operating conditions for a device, and to control operating conditions based on the previous conditions to improve the reliability characteristics of the device while permitting strenuous use as available. For example, the lifetime controller may permit strenuous use when the device is first powered on. Once a specified amount of strenuous use has occurred, the controller may cause the operating conditions to be reduced to reduce the wear on the device, and thus help to extend the lifetime of the device. Similarly, if a device is used in less strenuous conditions, the controller may accumulate credit which may be expended by permitting the device to operate in more strenuous conditions for a period of time.

23 Claims, 5 Drawing Sheets

(56) References Cited

U.S. PATENT DOCUMENTS

| | | | | |
|---|---|---|---|---|
| 7,408,473 B2* | 8/2008 | Adkins | G01N 33/004 | 340/632 |
| 7,746,240 B2* | 6/2010 | Vij | G08B 21/14 | 340/540 |
| 7,758,240 B2 | 7/2010 | Julio et al. | | |
| 7,904,254 B2 | 3/2011 | Ibori et al. | | |
| 8,073,653 B2* | 12/2011 | Suzuki | G07C 3/00 | 702/181 |
| 8,151,094 B2 | 4/2012 | Vera et al. | | |
| 8,248,095 B2 | 8/2012 | Noorlag et al. | | |
| 9,000,934 B1* | 4/2015 | Gordin | G06Q 10/20 | 315/119 |
| 2004/0030524 A1* | 2/2004 | Jarrell | G05B 23/0221 | 702/113 |
| 2008/0155282 A1 | 6/2008 | Gammie et al. | | |
| 2008/0186044 A1 | 8/2008 | Singh | | |
| 2008/0301499 A1* | 12/2008 | Grichnik | G05B 23/0232 | 714/25 |
| 2009/0096407 A1* | 4/2009 | Flickinger | G05B 23/0283 | 318/565 |
| 2009/0249128 A1* | 10/2009 | Heckman | G05B 23/0283 | 714/47.2 |
| 2010/0138267 A1* | 6/2010 | Vittal | G05B 23/0283 | 702/184 |
| 2010/0318246 A1* | 12/2010 | Bieker | B61K 9/08 | 701/19 |
| 2010/0332272 A1* | 12/2010 | Ong | F03D 7/0292 | 705/7.36 |
| 2011/0015875 A1* | 1/2011 | Walte | G01N 33/0032 | 702/24 |
| 2011/0106510 A1* | 5/2011 | Poon | G05B 23/0254 | 703/2 |
| 2011/0296810 A1* | 12/2011 | Hardwicke | G05B 23/0283 | 60/39.091 |
| 2012/0029839 A1* | 2/2012 | Ritter | G05B 23/0283 | 702/34 |
| 2012/0136587 A1* | 5/2012 | Nagathil | G05B 19/4065 | 702/34 |
| 2012/0283963 A1* | 11/2012 | Mitchell | F01D 17/02 | 702/34 |
| 2013/0021119 A1* | 1/2013 | Sid | B60K 28/10 | 335/1 |
| 2013/0090900 A1* | 4/2013 | Gering | G01R 31/3651 | 703/2 |
| 2013/0190095 A1* | 7/2013 | Gadher | G06F 11/008 | 463/42 |
| 2013/0191076 A1* | 7/2013 | Jiang | G05B 23/0262 | 702/184 |
| 2014/0019091 A1* | 1/2014 | Higgins | G06F 15/00 | 702/184 |
| 2014/0039806 A1* | 2/2014 | Liao | G01M 99/00 | 702/34 |
| 2014/0088888 A1* | 3/2014 | Poon | F03B 15/00 | 702/34 |
| 2014/0188405 A1* | 7/2014 | Ba | G06F 17/00 | 702/34 |
| 2014/0244133 A1* | 8/2014 | De Prosperis | G05B 23/0208 | 701/100 |
| 2014/0231791 A1 | 9/2014 | Grabau et al. | | |
| 2014/0261791 A1* | 9/2014 | Grabau | F16K 37/0075 | 137/551 |
| 2014/0265976 A1* | 9/2014 | Weiss | G05D 23/1917 | 318/471 |
| 2014/0288855 A1* | 9/2014 | Deshpande | F03D 17/00 | 702/34 |
| 2014/0324385 A1* | 10/2014 | Sun | H02K 11/25 | 702/183 |
| 2015/0088434 A1* | 3/2015 | Grabau | G01M 99/008 | 702/34 |
| 2015/0106059 A1* | 4/2015 | Ekanayake | G01M 15/14 | 702/182 |
| 2015/0268210 A1* | 9/2015 | Cristoforo | G08B 21/14 | 702/24 |
| 2015/0276693 A1* | 10/2015 | Sid | B60K 28/10 | 307/116 |
| 2015/0321425 A1* | 11/2015 | Stava | G06F 17/50 | 700/98 |
| 2016/0090958 A1* | 3/2016 | Berkson | F02N 11/0833 | 701/112 |
| 2017/0058741 A1* | 3/2017 | Fosaaen | G01N 27/4067 | |

* cited by examiner

CONTROLLING ELECTRICAL DEVICE BASED ON TEMPERATURE AND VOLTAGE

BACKGROUND

Technical Field

Embodiments described herein are related to lifetime management for an electronic device.

Description of the Related Art

Electronic devices are typically designed to a target service lifetime, during which the device is expected to operate correctly. Beyond this service lifetime, the device may fail to operate correctly due to wear or other common aging effects. While a given instance of a device may have a defect that causes the device to fail before the lifetime, generally the failure rate prior to the end of the lifetime is expected to be on the order of one in several million instances.

Reliability analysis generally has to do with determining the worst case conditions that can cause the device to fail, and ensuring that the components of the device will not fail more often than the desired failure rate over the desired lifetime under those worst case conditions. Such determinations are intentionally conservative, and thus numerous devices that do not frequently experience worst-case conditions may have lifetimes that far exceed the design lifetime. While the additional lifetime can be welcome, it can also indicate at the device is over-engineered and possibly more expensive than necessary.

SUMMARY

In an embodiment, a lifetime controller is configured to monitor operating conditions for a device, and to control operating conditions based on the previously detected conditions to improve the reliability characteristics of the device while permitting strenuous use as available. For example, the lifetime controller may permit strenuous use when the device is first powered on. Once a specified amount of strenuous use has occurred, the controller may cause the operating performance to be reduced to limit the wear on the device, and thus help to extend the lifetime of the device. Similarly, if a device is used in less strenuous conditions, the controller may accumulate credit which may be expended by permitting the device to operate in more strenuous conditions for a period of time. By controlling the device in this fashion, a low lifetime failure rate for a set of devices may be maintained while permitting strenuous operation of the device (which could cause wear) for at least some periods of time to satisfy user demands.

BRIEF DESCRIPTION OF THE DRAWINGS

The following detailed description makes reference to the accompanying drawings, which are now briefly described.

While embodiments described in this disclosure may admit to various modifications and alternative forms, specific embodiments thereof are shown by way of example in the drawings and will herein be described in detail. It should be understood, however, that the drawings and detailed description are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

In various embodiments, a system may include an electrical device for which lifetime is to be managed. The electrical device may be any device. For example, the electrical device may include any of the following in some embodiments an integrated circuit, two or more integrated circuits, one or more integrated circuits mounted on a board with one or more other components, etc. The electrical device may be part of a product or the entire product, in various embodiments. The electrical device may have one or more operating parameters that are monitored to manage lifetime. Operating parameters may be any data that represents the operating conditions of the device. Exemplary parameters may include one or more supply voltage magnitudes, one or more supply current magnitudes, one or more operating temperatures, one or more operating clock frequencies, etc. Embodiments including a particular electrical device and operating parameters thereof are described in more detail as an example below, but any device and parameters may be used in other embodiments.

Figure 1:
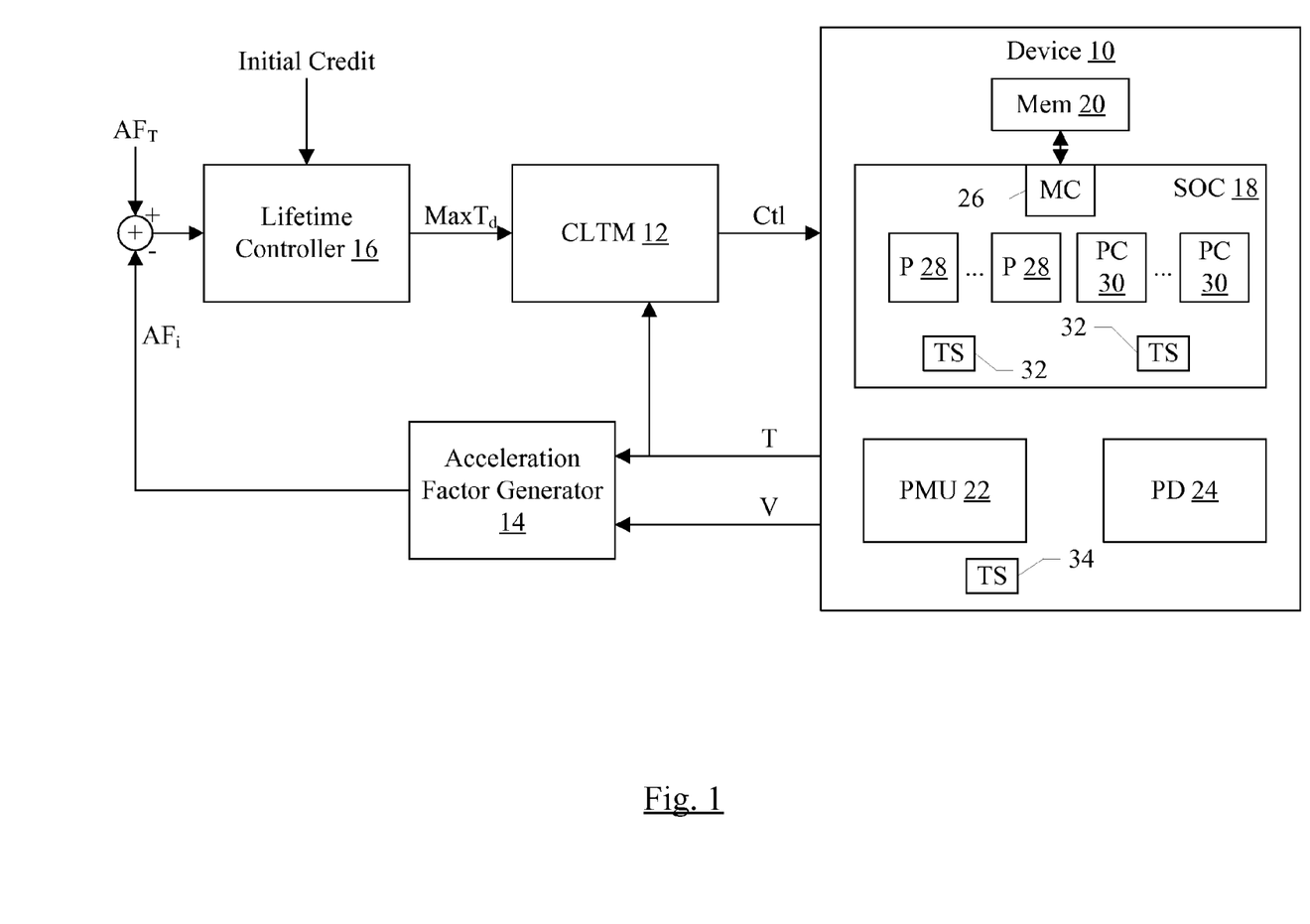
FIG. 1 is a block diagram of a system implementing one embodiment of lifetime control.

FIG. 1 is a block diagram of one embodiment of a system including an electrical device 10, a closed loop thermal management (CLTM) controller 12, an acceleration factor generator 14, and a lifetime controller 16. In the illustrated embodiment, the acceleration factor generator 14 is coupled to receive one or more operating parameters from the device 10 and is configured to generate an instantaneous acceleration factor ($AF_i$). The lifetime controller 16 is coupled to receive a difference between a target acceleration factor ($AF_T$) and the instantaneous acceleration factor ($AF_i$). Optionally, the lifetime controller 16 may be coupled to receive an initial credit. The lifetime controller is configured to provide various constraints and/or control data (e.g. a maximum die temperature, $MaxT_d$) to the CLTM controller 12, which is configured to provide one or more controls to the device 10. The constraints/control data may be generically referred to as "control parameters."

In the embodiment of FIG. 1, the device 10 includes an integrated circuit implementing a system on a chip (SOC) 18, a memory 20, a power management unit (PMU 22), and one or more peripheral devices 24. The SOC 18 may include a memory controller 26, one or more processors 28, and one or more peripheral components 30. The SOC 18 may further include one or more temperature sensors 32, and the device 10 may further include other temperature sensors such as the temperature sensor 34.

In the illustrated embodiment, the monitored operating parameters for lifetime management include the operating temperature (T) and supply voltage magnitude (V). The operating temperature may be measured (e.g. via temperature sensors 32 and/or 34). In one embodiment, the operating temperature may be the die temperature of the SOC 18 (that is, the temperature of the semiconductor substrate in which the SOC 18 is fabricated, as measured by the temperature sensor(s) 32). Other operating temperatures may include the external temperature of the SOC 18 (e.g. the temperature of the package of the SOC 18), the temperature of other components such as the PMU 22, the peripheral devices 24, the device 10 as a whole, etc.). Combinations of various operating temperatures may be used (e.g. an average of several measured temperatures from different points in the device 10). In an embodiment, one or more of the temperatures may be synthesized from other data available to the system. For example, the system may have a model of device thermal transfer characteristics that allows it to calculate an operating temperature from indirect measurements such as input power. The supply voltage magnitude may be a setting in the PMU 22, and thus need not be measured using a sensor, but rather may be recorded. The actual instantaneous supply voltage magnitude may vary due to loading, noise, etc. but may generally be targeted at the supply voltage magnitude setting. Accordingly, the monitored operating parameters may be either measured or recorded from a setting, or any combination thereof.

The acceleration factor generator 14 may receive the monitored parameters and may be configured to generate the instantaneous acceleration factor. The acceleration factor may represent how quickly the values of the monitored operating parameters may lead to end of life (failure) of the device 10. In an embodiment, the acceleration factor may be normalized to nominal values for the operating parameters. That is, the nominal values may be values at which the device 10 may operate continuously over its lifetime without experiencing failure rates greater than a specified target. There may be multiple nominal values (e.g. a curve on a graph of the operating parameters, which in one embodiment may be a straight line). The acceleration factor for the nominal values may be about 1. Values of the operating parameters that are more strenuous than the nominal values (e.g. values that are more likely to cause wear or damage to the device) may have acceleration factors greater than 1 and values of the operating parameters that are less strenuous than the nominal values may have acceleration factors less than 1.

In an embodiment, the target acceleration factor to which the instantaneous acceleration factor is compared may be 1. That is, over time, the instantaneous acceleration factor may be controlled toward this target. Periods of high stress (acceleration factors greater than 1) may be offset by periods of low stress (acceleration factors lower than 1) to arrive at the desired lifetime. The lifetime controller may accumulate credit during periods of low stress and may allow that credit to be consumed in periods of high stress before controlling the device 10 to prevent premature failure.

In another embodiment, the lifetime controller 16 may be initialized at boot with an initial credit. The initial credit represents credit that the lifetime controller 16 may consume even if the controller 16 has not yet detected less strenuous operation. The availability of the initial credit may permit early, high performance operation (which may enhance the user experience). To offset the initial credit, the target acceleration factor ($AF_T$) may be computed to be less than one. That is, the target acceleration factor $AF_T$ may recover the consumed credit represented by the initial credit.

Based on the difference between the target acceleration factor and the instantaneous acceleration factor, the lifetime controller 16 may be configured to generate control parameters for the operation of the device 10. The control parameters may serve as constraints on the device operation. That is, the device 10 may operate up to the constraint, but not exceed the constraint. Operation within the constraint (i.e. not approaching the constraint) is also permitted. The constraint may be placed on one or more operating parameters of the device 10. For example, in the illustrated embodiment, the constraint may be on the operating temperature (and specifically the die temperature of the SOC 18). The constraint may be placed on an operating parameter that is not monitored by the acceleration factor generator 14, in some embodiments. In other embodiments, the constraint may be placed on an attribute other than an operating parameter (e.g. maximum continuous up time, which is a measurement of a maximum time that the SOC 18 is permitted to be actively executing before a sleep or power down time is desired).

The control parameters generated by the lifetime controller 16 may directly control the operation of the device 10, in some embodiments. In the illustrated embodiment, the control parameters may indirectly control operation of the device 10 by providing a constraint to another controller (the CLTM controller 12 in this example). The lifetime controller 16 may generate a maximum temperature constraint, for example. If the lifetime controller 16 determines that performance is to be limited to enhance lifetime, a lower maximum temperature may be generated. If credit is available, a higher maximum temperature may be generated. Other embodiments may control other aspects of the device 10 (e.g. processor operating frequency, operating frequencies of other components, supply voltage magnitude, etc.). Combinations of constraints may be used. Generally, credits may be accumulated when the difference between the target acceleration factor and the instantaneous acceleration factor is positive and consumed when the difference is negative.

More particularly in one embodiment, the lifetime controller 16 may be configured to control operation of the device 10 based on the acceleration factor difference and a history of previous differences. For example, the lifetime controller 16 may implement proportional-integral (PI) control. The integral portion of the controller 16 may accumulate the credits and may be initialized with the initial credits.

In one embodiment, the history of acceleration factor differences may be a history since the device was first placed into service (e.g. since the initial boot of the device 10 by the user, after purchase of the device 10 from the manufacturer by the user, or the time since the device was manufactured). To track history in such embodiments, the history may be saved when the device 10 is powered off. The history may be saved in non-volatile memory in the device 10, for example. Alternatively or in addition, the history may be saved external to the device 10 (e.g. in the "cloud," on a server to which the device 10 may be connected, on a computer to which the device is periodically synchronized, etc.). Saving the history externally may be used to ensure that the history is retained if the device 10 is reset to factory settings due to a soft failure, corruption of device data, etc. In such embodiments, the initial credit at first boot may be a total initial credit. In subsequent boots, the initial credit may restore the credit (or deficit) from the saved history.

In another embodiment, the history of acceleration factor differences may be a history since the most recent boot of the device 10. Such embodiments need not attempt to store the history across power down events in the device 10. In such an embodiment, the initial credit at each boot may be a credit determined from a total credit allocated to initial credits and an expected number of lifetime boots of the device 10. For example, if the device 10 is expected to boot about 500 times over its service lifetime, the initial credit at each boot may be the total allocated credit divided by 500. It is noted that 500 boots is only an example provided for illustration; the expected number of lifetime boots may be higher or lower than the example of 500 boots.

The CLTM controller 12 may be provided to control the device 10 based on the current temperature and a maximum (or control target) temperature. In the absence of the lifetime controller 16, the CLTM controller 12 may be provided a maximum temperature that is static and is based on the chance of immediate failure (not lifetime failure), comfortable use of the device (e.g. a handheld device may not be permitted to get hot enough that holding the device causes discomfort or injury), etc. The CLTM controller 12 may be configured to provide a variety of controls in various embodiments. For example, supply voltages and/or clock frequencies may be reduced to reduce operating temperature. Power states may be changed to use different voltage/frequency pairs that may cause less wear on the device 10. Amount of active operation per unit time may be varied (e.g. amount of active execution in the processors 28). The CLTM controller 12 may receive the temperature measurements as well, for comparison of the measured temperature to the maximum temperature. It is noted that one or both of the CLTM controller 12 and the lifetime controller 16 may be implemented in software executed on one or more of the processors included in the SOC 18 and/or in hardware.

The SOC 18, as mentioned previously, may be a single semiconductor substrate on which many system components may be integrated. The processors 28 may include circuitry that implements an instruction set architecture, and thus may execute programs coded to the instruction set architecture employed by the processors. The processors may have any construction and design, included in-order or out-of-order execution, superscalar architecture, pipelined design, etc. Generally, a processor may include any circuitry and/or microcode configured to execute instructions defined in the instruction set architecture. Processors may encompass processor cores implemented on an integrated circuit with other components as a system on a chip (SOC 18) or other levels of integration. Processors may further encompass discrete microprocessors, processor cores and/or microprocessors integrated into multichip module implementations, processors implemented as multiple integrated circuits, etc. The processors may include general purpose processors (sometimes referred to as "application processors") or task-specific processors. The task-specific processors may be processors optimized for the specific tasks (e.g. digital signal processors or graphics processing units). The task-specific processors may also be smaller, lower performance general purpose processors provided to execute the software forming the specific task.

The peripheral components 30 may be on-chip peripherals, as compared to the peripheral devices 24 that may be off-chip. Any set of on-chip peripheral components may be included. For example, various image processing and display peripherals may be included (e.g. image signal processors, cameras, display controllers, graphics processing units (GPUs), etc.). Audio processing peripherals (e.g. digital signal processors (DSPs) and audio processing hardware) may be included. Compression/decompression units (e.g. audio/video compression and decompression) may be included. Audio/video coder/decoders (codecs) may be included. Network peripherals may be included. Peripheral components 30 that control external interfaces to peripheral devices 24 or other circuitry may in the device 10 may be included.

The memory controller 26 may include circuitry to interface to the memory 20 on behalf of the processors 28, the peripheral components 30, and various other circuitry in the SOC 18 and/or device 10. Any type of memory 20 may be supported. For example, the memory 20 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 26 may include queues for memory operations, for ordering (and potentially reordering) the operations and presenting the operations to the memory 20. The memory controller 26 may further include data buffers to store write data awaiting write to memory and read data awaiting return to the source of the memory operation.

The temperature sensors 32 and 34 may be any type of sensor that reacts in a detectable, predictable way to changes in temperature. The temperature sensors 32 may be implemented on chip in the SOC 18, while the temperature sensors 34 may be discrete sensors included in the system. Any number of on-chip and/or off-chip sensors may be used in various embodiments.

The peripheral devices 24 may be any other components that may be included in the device 10. For example, radio chips for wireless local-area networking (WLAN or "Wi-Fi™"), cellular communications, etc. may be included. Various other types of sensors such as any number of: an accelerometer, a gyroscope (or gyro), a magnetometer, an audio detector (e.g. a microphone), a photodetector that detects light or other electromagnetic energy, an altimeter, a pressure sensor, etc. User interface devices such as a button, a touch screen, a keyboard, a pointing device, a camera, etc. may also be peripheral devices 24.

The PMU 22 may be configured to supply various supply voltages to the SOC 18, the memory 20, and/or the peripheral devices 24. The PMU 22 may be programmable to enable/disable the supply voltages and may be programmable with the selected supply voltage magnitudes for each supply.

Figure 2:
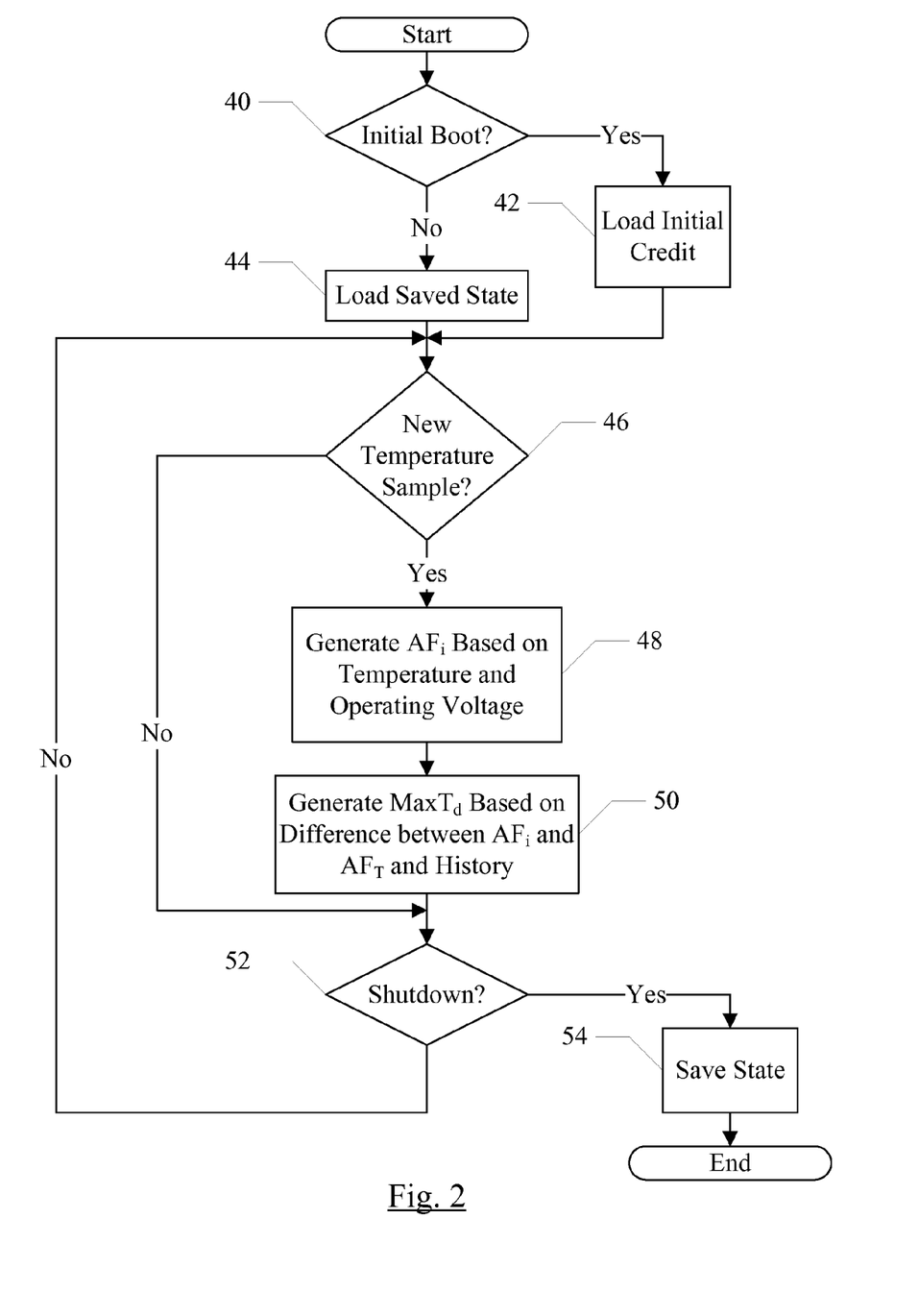
FIG. 2 is a flowchart illustrating one embodiment of lifetime control in the system of FIG. 1.

FIG. 2 is a flowchart illustrating operation of one embodiment of the acceleration factor generator 14 and the lifetime controller 16 in which state is saved between boots. While the blocks are shown in a particular order for ease of understanding in FIG. 2, other orders may be used. Operations represented by blocks may also be performed in parallel. The acceleration factor generator 14 and the lifetime controller 16 may be configured to implement the operation shown in FIG. 2.

The operation illustrated in the flowchart begins at the boot of the device 10. If the device 10 is performing its initial boot (decision block 40, "yes" leg), the lifetime controller 16 may be configured to load the initial credit (block 42). The initial credit may be provided in a predefined location in the device 10, for example. In another embodiment, the initial credit may be coded into the lifetime controller 16 or may be provided from an external source to which the device 10 may connect. If the device 10 is not performing its initial boot (decision block 40, "no" leg), the saved state from the most recent shutdown may be loaded (block 44).

During operation, at various points in time, a temperature sample may be taken. For example, a temperature sample may be taken once every 5 seconds. Shorter or longer intervals may be used in other embodiments. In response to a temperature sample (decision block 46, "yes" leg), the acceleration factor generator 14 may be configured to generate the instantaneous acceleration factor ($AF_i$) based on the sampled temperature and the supply voltage magnitude (block 48). The lifetime controller 16 may generate the maximum die temperature ($MaxT_d$) responsive to a difference between $AF_i$ and $AF_T$ as well as a history of the differences, as represented by the initial credit/state load at boot and the subsequent temperature samples (block 50). If a new temperature has not been received (decision block 46, "no" leg), blocks 48 and 50 may be skipped.

If a shutdown event occurs (decision block 52, "yes" leg), the lifetime controller 16 may be configured to save the state representing the accumulated history of $AF_i/AF_T$ differences (block 54). The state may then be available for reload at the next boot. A shutdown event may occur when the device 10 is being powered off. For example, a shutdown event may be responsive to a user interaction. A shutdown event may be responsive to a measurement of unsafe device temperature. A shutdown event, for portable devices operating from a battery, may be responsive to low battery power.

Figure 3:
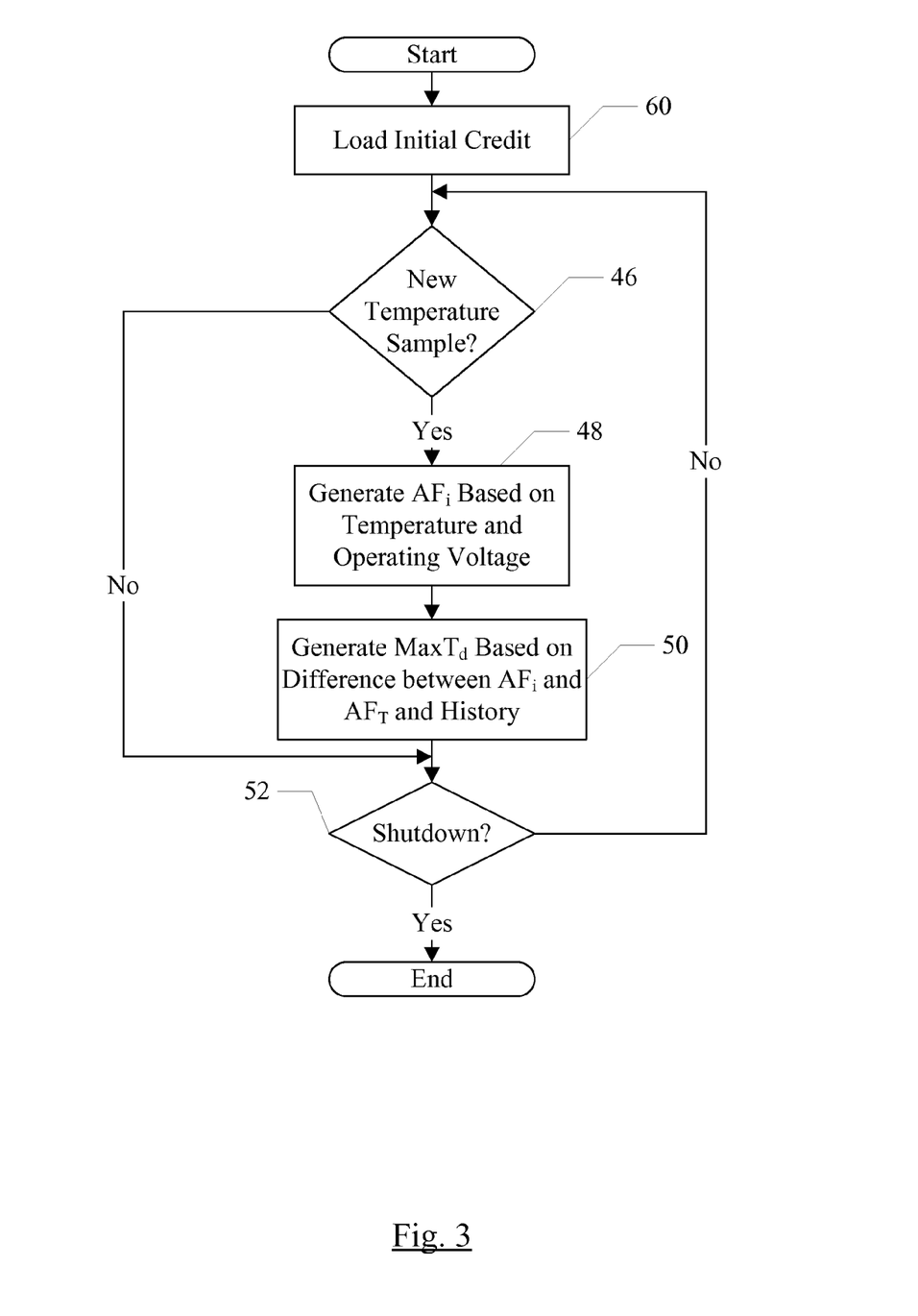
FIG. 3 is a flowchart illustrating another embodiment of lifetime control in the system of FIG. 1.

FIG. 3 is a flowchart illustrating operation of one embodiment of the acceleration factor generator 14 and the lifetime controller 16 in which state is not saved between boots. While the blocks are shown in a particular order for ease of understanding, other orders may be used. Operations represented by blocks may also be performed in parallel. The acceleration factor generator 14 and the lifetime controller 16 may be configured to implement the operation shown in FIG. 3.

The operation of the flowchart may begin at the boot of the device 10. Because there is no saved state in this embodiment, the lifetime controller 16 may load the initial credit on each boot (block 60).

During operation, at various points in time, a temperature sample may be taken as mentioned above in the embodiment of FIG. 2. In response to a temperature sample (decision block 46, "yes" leg), the acceleration factor generator 14 may be configured to generate the instantaneous acceleration factor ($AF_i$) based on the sampled temperature and the supply voltage magnitude (block 48). The lifetime controller 16 may generate the maximum die temperature ($MaxT_d$) responsive to a difference between $AF_i$ and $AF_T$ as well as a history of the differences, as represented by the initial credit/state load at boot and the subsequent temperature samples (block 50). If a new temperature sample has not been received (decision block 46, "no" leg), blocks 48 and 50 may be skipped. If a shutdown event occurs (decision block 52, "yes" leg), no state is saved in this embodiment.

Figure 4:
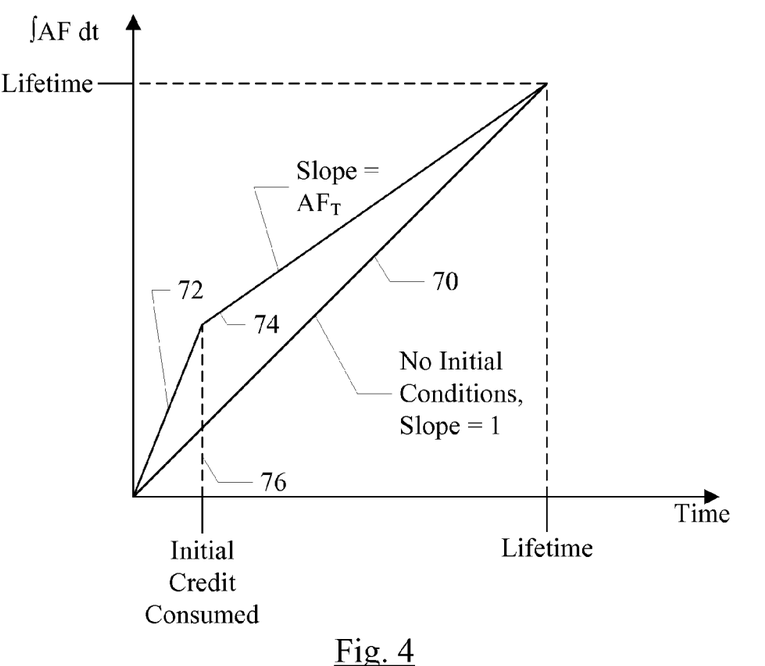
FIG. 4 is a graph illustrating one embodiment of lifetime control as a function of time.

Turning now to FIG. 4, a graph is shown illustrating one embodiment of acceleration factors over time to reach a at least a targeted lifetime. In the graph of FIG. 4, time is illustrated on the horizontal axis, with units increasing from left to right from initial boot on the left until the targeted lifetime is reached on the right. On the vertical axis, the integral of the acceleration factor is shown, from 0 to the lifetime amount. Controlled as described herein by the lifetime controller 16 in each device 10, a set of devices 10 may reach the targeted lifetime with a low failure rate (e.g. on the order of one in millions of devices). The lifetime controller 16 may permit high performance use of the devices 10 when credit is available, which may provide a better user experience at times of high stress use, while still maintaining a low failure rate. For a given device 10, the lifetime controller 16 may reduce the risk of failure and thus may lead to an extended life as compared to unconstrained operation.

Operation in the absence of an initial credit is illustrated via the straight lower line 70 on the graph. The line 70 has a unit slope, and thus $AF_T=1$. That is, if the average acceleration factor over the life of the device is 1, the device 10 should reach the lifetime with a specified failure rate. The actual $AF_i$ experienced throughout the life of the device may vary from $AF_T$, but the lifetime controller may control $AF_i$ over time to approximate $AF_T$ (or at least to avoid exceeding $AF_T$, on average, over time).

Also illustrated in FIG. 4 is a curve that may result from the use of initial credits. In the illustrated embodiment, a line 72 that is steeper than the no initial credit line 70 may be permitted initially. The slope of the line 72 is greater than $AF_T$ because the initial credits permit the operation at greater than $AF_T$ until the credit is exhausted. At a certain time (dotted line 76), the initial credit is consumed. The slope of the curve reduces to $AF_T$ (line 74), which is calculated so that operation over the remaining life concludes at the specified failure rate.

Figure 5:
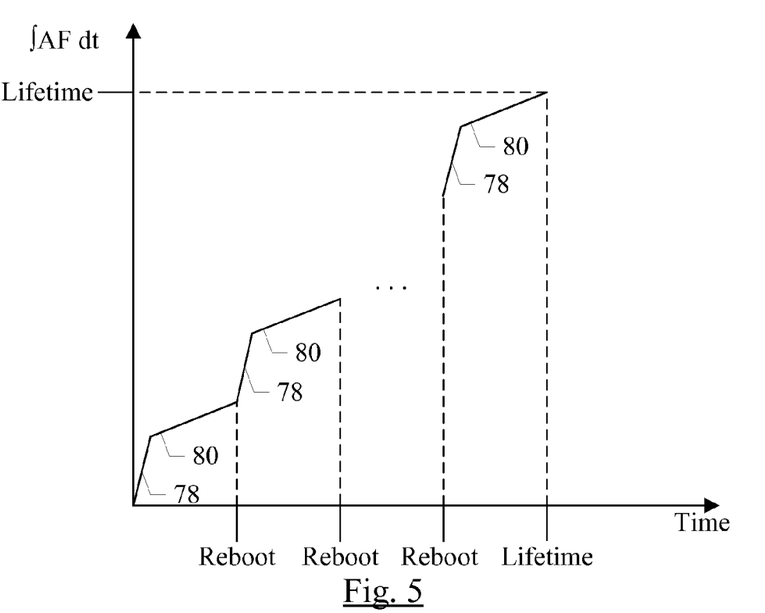
FIG. 5 is a graph illustrating another embodiment of lifetime control as a function of time.

FIG. 5 is another graph corresponding to the embodiment of FIG. 3. In this embodiment, a portion of the total allocated initial credit is provided after each reboot. Accordingly, at each reboot, a steep section of the curve 78 is provided followed by a shallower slope 80.

Figure 6:
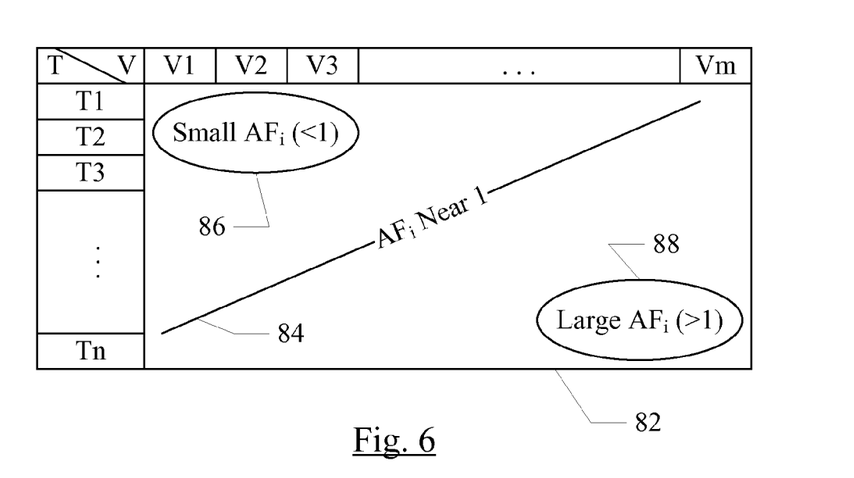
FIG. 6 is an embodiment of a table of acceleration factors.

In an embodiment, the acceleration factor generator 14 may be configured to use a lookup table to convert input temperatures and supply voltage magnitudes to acceleration factors. FIG. 6 is a block diagram of one embodiment of such a table 82. The entries in the table 82 may be populated according to simulation results over the design of the device 10 in various conditions, based on specifications for the components of the device 10, or by other methods. In cases in which a temperature-voltage combination does not explicitly appear in the table 82, interpolation between the values in the table entries may be used to determine $AF_i$.

As mentioned previously, the acceleration factors may be normalized to nominal values. The nominal values may lie along a line near the diagonal 84 from the lower left to the upper right of the table 82. The values in this region of the table may thus be near 1. Lower supply voltage magnitudes and lower temperatures may both induce less wear/damage in the monitored components, and thus entries in the upper left region of the table, above the diagonal 84 may be small acceleration factors (i.e. less than 1)—reference numeral 86 in FIG. 6. Similarly, higher voltage magnitudes and/or temperatures may result in higher acceleration factors above the diagonal 84 (i.e. greater than one)—reference numeral 88 in FIG. 6.

Figure 7:
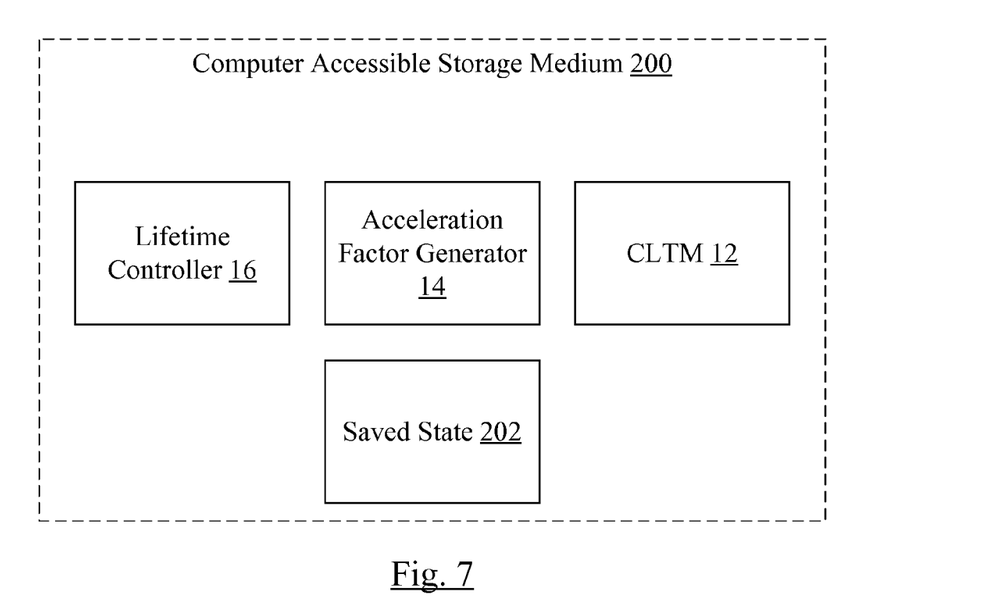
FIG. 7 is a block diagram of one embodiment of a computer accessible storage medium.

FIG. 7 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 7 may store code forming the lifetime controller 16, the acceleration factor generator 14, and/or the CLTM controller 12. The computer accessible storage medium 200 may still further store the saved state 202 (e.g. the accumulated credit from previous operation), as mentioned above with regard to FIG. 2. The lifetime controller 16 may include instructions which, when executed by the processor 28, implement the operation described for the lifetime controller 16 above. The acceleration factor generator 14 may include instructions which, when executed by the processor 28, implement the operation described for the acceleration factor generator 14 above. The CLTM controller 12 may include instructions which, when executed by the processor 28, implement the operation described for the CLTM controller 12 above. Alternatively, one or more of the above may be implemented partially in hardware and partially in instructions executed by the processor 28. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
an electrical device operating responsive to a supply voltage during use, wherein the electrical device includes one or more temperature sensors that measure operating temperatures in the electrical device to generate an operating temperature measurement during use;
an acceleration factor generator coupled to receive the operating temperature measurement and a magnitude of the supply voltage, wherein, during use, the acceleration factor generator determines an instantaneous acceleration factor measuring a current acceleration of end of life experienced by the electrical device;
a first controller coupled to receive a difference between a target acceleration factor and the instantaneous acceleration factor, wherein the target acceleration factor is calculated to result in no more than a targeted failure rate over a targeted lifetime, wherein the first controller generates one or more controls to constrain operation of the electrical device responsive to a history of the difference during use; and
a second controller coupled to the first controller and to the electrical device, wherein the second controller constrains the operation of the electrical device during use responsive to the one or more controls from the first controller.

2. The system as recited in claim 1 wherein the history is gathered since a most recent reboot of the system.

3. The system as recited in claim 1 wherein the history is gathered since an initial boot of the system.

4. The system as recited in claim 1 wherein the one or more controls comprise a maximum operating temperature for the electrical device.

5. The system as recited in claim 1 wherein the first controller accumulates credit responsive to the difference being positive during use, and wherein the first controller permits less constrained operation responsive to the accumulated credit during use.

6. The system as recited in claim 1 wherein the first controller initializes a credit during boot of the system, and wherein the first controller permits less constrained operation responsive to the credit during use.

7. A method comprising:
detecting one or more operating parameters of an electrical device, wherein an operating temperature of a semiconductor substrate in an integrated circuit within the electrical device is one of the operating parameters;
generating, responsive to the one or more operating parameters, an acceleration factor that represents an acceleration of an end of life of the electrical device with respect to values of the one or more operating parameters at which the electrical device is expected to meet a defined failure rate at a defined end of life;
generating, responsive to the acceleration factor and a target acceleration factor, one or more constraints for operation of the electrical device; and
operating the electrical device within the constraints to preserve the defined end of life.

8. The method as recited in claim 7 wherein a supply voltage magnitude is another one of the operating parameters.

9. The method as recited in claim 7 wherein the acceleration factor and the target acceleration factor are normalized to values of the one or more operating parameters at which the electrical device is operable continuously over its lifetime to meet the defined end of life.

10. The method as recited in claim 7 wherein generating the one or more constraints permit operation at greater than the normalized value responsive to a credit in the constraint generation.

11. The method as recited in claim 10 wherein the credit is an initial credit loaded at initialization of the electrical device.

12. The method as recited in claim 11 wherein the target acceleration factor is calculated to offset the initial credit.

13. The method as recited in claim 10 further comprising accumulating the credit responsive to operating the electrical device at less than the constraints.

14. A non-transitory computer accessible storage medium storing a plurality of instructions which, when executed by a processor in an electrical device:
receive a difference between a target acceleration factor determined to prevent premature end of life for the electrical device and an instantaneous acceleration factor;
generate one or more constraints for the operation of the electrical device responsive to the difference; and
constrain the operation of the electrical device responsive to the constraints, wherein the constraints permit operation of the electrical circuit above a point at which continuous operation is possible to reach the end of life responsive to a credit accumulated due to the instantaneous acceleration factor being less than the target acceleration factor for one or more previous samples of the instantaneous acceleration factor.

15. The non-transitory computer accessible storage medium as recited in claim 14 wherein the instructions, when executed, load an initial credit during initialization of the electrical system, wherein the initial credit causes generation of constraints that permit operation of the electrical circuit above a point at which continuous operation is possible to reach the end of life.

16. The non-transitory computer accessible storage medium as recited in claim 14 wherein the plurality of instructions, when executed, save state that represents a history of the differences prior to the electrical device shutting down.

17. The non-transitory computer accessible storage medium as recited in claim 14 wherein the plurality of instructions, when executed, generate the instantaneous acceleration factor from one or more operating parameters of the electrical device.

18. A system comprising:
an electrical device operating responsive to a supply voltage during use, wherein the electrical device includes one or more sensors that measure one or more operating parameters in the electrical device during use;
a monitor circuit coupled to receive the one or more operating parameters wherein, during use, the monitor circuit determines an instantaneous acceleration factor measuring a current acceleration of end of life experienced by the electrical device responsive to the one or more operating parameters; and
a controller coupled the monitor circuit, wherein the controller constrains operation of the electrical device responsive to a difference between a target acceleration factor and the instantaneous acceleration factor, wherein the target acceleration factor is calculated to result in no more than a targeted failure rate of the electrical device over a targeted lifetime of the electrical device, wherein the controller constrains operation of the electrical device responsive to a history of the difference during use.

19. The system as recited in claim 18 wherein the history is gathered since a most recent reboot of the system.

20. The system as recited in claim 18 wherein the history is gathered since an initial boot of the system.

21. The system as recited in claim 18 wherein the controller constrains a maximum operating temperature of the electrical device.

22. The system as recited in claim 18 wherein the controller accumulates credit responsive to the difference being positive during use, and wherein the controller permits less constrained operation responsive to the accumulated credit during use.

23. The system as recited in claim 18 wherein the controller initializes a credit during boot of the system, and wherein the controller permits less constrained operation responsive to the credit during use.

* * * * *